No. 734,565. PATENTED JULY 28, 1903.
W. P. KIDDER.
APPARATUS FOR REMOVING BARK FROM STANDING TREES.
APPLICATION FILED OCT. 4, 1902.
NO MODEL.
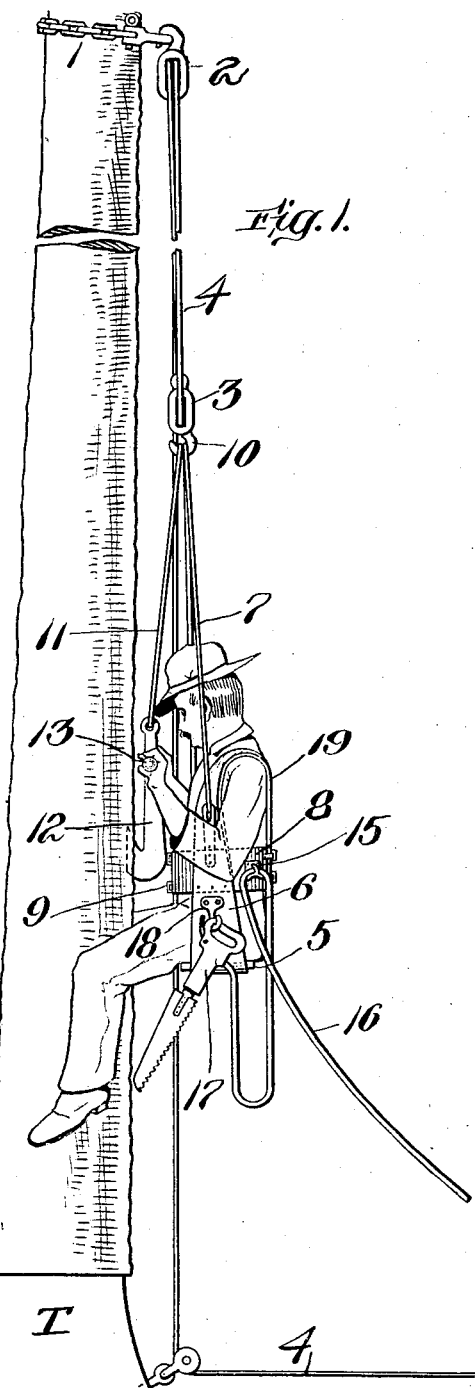
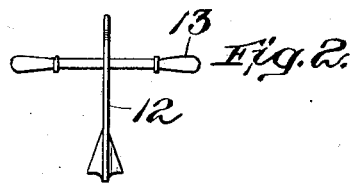
Witnesses:
F. J. V. Dakin
E. A. Allen
Inventor:
Wellington Parker Kidder,
by Edward S. Beach
Attorney.
THE NORRIS PETERS CO., PHOTO-LITHO., WASHINGTON, D. C.

No. 734,565.

Patented July 28, 1903.

UNITED STATES PATENT OFFICE.

WELLINGTON PARKER KIDDER, OF BOSTON, MASSACHUSETTS, ASSIGNOR TO FRANK H. GOODYEAR AND GEORGE E. MATTHEWS, TRUSTEES, OF BOSTON, MASSACHUSETTS.

APPARATUS FOR REMOVING BARK FROM STANDING TREES.

SPECIFICATION forming part of Letters Patent No. 734,565, dated July 28, 1903.

Application filed October 4, 1902. Serial No. 126,000. (No model.)

*To all whom it may concern:*

Be it known that I, WELLINGTON PARKER KIDDER, a citizen of the United States, residing at Boston, in the county of Suffolk and State of Massachusetts, have invented certain new and useful Improvements in Apparatus for Use in Removing Bark from Standing Trees, of which the following is a specification, reference being had therein to the accompanying drawings.

Figure 1 is an elevation of a tree to which is attached a seat capable of being raised and lowered and also a bark-splitting implement. Fig. 2 is a view of the bark-splitter.

In my United States Patent No. 707,428, of August 19, 1902, and in my application, Serial No. 125,998, of even date herewith, I have set forth apparatus for use in removing bark from standing trees and the desirability and advantages of removing bark from standing trees instead of removing bark from felled trees, as heretofore.

The object of my present invention is to produce an apparatus in which the operator may sit, and also a bark-splitter which is carried by said apparatus and is under the manual control of the operator, the apparatus and operator being lifted by power up the standing-tree trunk and lowered by hand or otherwise, if desired.

In the drawings, T represents the standing-tree trunk; 1, a trunk-clamp of any desired construction for supporting a tackle, comprising, say, any suitable upper pulley-block 2 and lower pulley-block 3 and fall 4, which is best of wire rope. The lower pulley-block 3 supports the seat 5, the opposite ends thereof being provided with upward sides 6, which are attached conveniently by the loop 7 to the lower tackle-block. On the sides 6 there is secured a belt 8, provided at its front with suitable fasteners 9, so that the operator sitting on the seat may fasten the belt around his waist and be securely held in the seat. The tackle conveniently, by means of the hook 10, supports a chain 11, the lower end of which is fast to the upper end of the hook-shaped bark-splitter (or other rossing implement) 12. The shank of this splitter or rossing implement 12 is provided with a pair of transverse handles 13, one handle projecting on one side of the shank and the other handle projecting on the other side of the shank, so that when the operator is in the seat and is being lifted up the tree-trunk he may, by manual control of the handles 13 13, maintain the bark-stripper properly in place with its point between the wood and bark. The operator is thus relieved from the work of supporting the weight and resistance of the bark stripper or splitter or whatever other rossing instrument may be carried by the tackle, and he is free to properly manipulate the implement by means of the handles 13. It may be that in practice a single handle rather than two handles, as shown, will be all that will be desired and that the handle may be otherwise placed on the implement 12 than is here shown.

I do not claim herein either the trunk-clamp or, broadly, any pneumatic arrangement, for the same is shown in my application, Serial No. 125,998, of even date herewith.

The belt 8 is preferably provided on its outer side with a pneumatic-tube support 15, through which the pneumatic tube 16 of the pneumatic tool 17 is carried. A hook 17, fast on the side 6, serves to support the pneumatic tool 17 when the same is not in use by the person sitting in the seat. If desired and preferably, the seat is provided with shoulder-straps 19, one for each shoulder, so as to better secure the operator in place. The purpose of having the pneumatic tube 16 supported by the seat is to relieve the occupant of the seat from the great weight of the pipe when, for example, the operator is forty or fifty or sixty or more feet above the ground, the pneumatic tube leading back to a suitable air-compressor.

What I claim is—

1. In apparatus for removing bark from standing trees, the combination of a tree-clamp; fall and tackle supported by said clamp; seat raised and lowered by the fall and tackle; and bark-operating apparatus carried by the fall and tackle; and having a handle above the seat.

2. In apparatus for removing bark from standing trees, the combination of a pulley-block and rossing implement supported thereon; and a man-supporting seat supported by said pulley-block.

In testimony whereof I affix my signature in presence of two witnesses.

WELLINGTON PARKER KIDDER.

Witnesses:
E. A. ALLEN,
M. E. COVENEY.